(12) United States Patent
Carvalho et al.

(10) Patent No.: US 8,515,064 B2
(45) Date of Patent: Aug. 20, 2013

(54) METHOD AND AN APPARATUS FOR KEY MANAGEMENT IN A COMMUNICATION NETWORK

(75) Inventors: Tereza Cristina Melo de Brito Carvalho, Sao Paulo (BR); Vlad Constantin Coroama, Bucuresti (RO); Mats Näslund, Bromma (SE); Makan Pourzandi, Montreal (CA); Marcos Antonio Simplicio, Jr., São Paulo (BR); Yeda Regina Venturini, Votorantin-SP (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 52 days.

(21) Appl. No.: 13/127,079

(22) PCT Filed: Oct. 30, 2008

(86) PCT No.: PCT/SE2008/051240
§ 371 (c)(1),
(2), (4) Date: May 2, 2011

(87) PCT Pub. No.: WO2010/050861
PCT Pub. Date: May 6, 2010

(65) Prior Publication Data
US 2011/0211693 A1  Sep. 1, 2011

(51) Int. Cl.
*H04L 9/00* (2006.01)
*H04N 7/167* (2011.01)

(52) U.S. Cl.
USPC .......................................... 380/200; 380/277

(58) Field of Classification Search
USPC .................................. 380/200, 277
See application file for complete search history.

(56) References Cited

U.S. PATENT DOCUMENTS
2007/0143600 A1* 6/2007 Kellil et al. .................. 713/163

FOREIGN PATENT DOCUMENTS
EP    1 549 010       6/2005
WO    WO 2006/054927  5/2006

OTHER PUBLICATIONS

International Search Report for PCT/EP2008/051240, mailed Oct. 21, 2009.
International Preliminary Report on Patentability with Amended Sheets, dated Aug. 25, 2010.
Wang, Y. et al., "Efficient Group Kay Management in Wireless Networks", Information Technology, (Apr. 10, 2006), pp. 432-439.
Pinto, A. et al., "SMIz—Secure Multicast IPTV with Efficient Support for Video Channels Zapping", [Online], (Jun. 22, 2008), 12 pages.

* cited by examiner

*Primary Examiner* — Kambiz Zand
*Assistant Examiner* — Aubrey Wyszynski
(74) *Attorney, Agent, or Firm* — Nixon & Vanderhye PC

(57) ABSTRACT

A method of key management in a communication network that includes a plurality of groups with each group including one or several members authorized to have access to key-protected services is provided by an apparatus. The method includes determining when a member starts a switching action from one service to another. A time dependent quantity starting from the switching action is determined. The method includes determining that the member is a member of a switching group when the quantity is less than a threshold value is made, and when the quantity is larger than the threshold, determining that the member has decided to join a new group, and changing the appropriate access key(s).

29 Claims, 6 Drawing Sheets

METHOD AND AN APPARATUS FOR KEY MANAGEMENT IN A COMMUNICATION NETWORK

This application is the U.S. national phase of International Application No. PCT/SE2008/051240, filed 30 Oct. 2008, which designated the U.S., the entire content of which is hereby incorporated by reference.

TECHNICAL FIELD

The present invention relates generally to a communication network wherein key-protected services are provided to users, and more particularly to an apparatus and a method of key management in the communication network.

BACKGROUND

Nowadays, several technologies exist to bring analogue services and digital internet protocol (IP) services to a user in, e.g., a home environment, enterprise environment, public environment, etc. trough broadcasting, multicasting, and/or unicasting over wireless networks, terrestrial networks, satellite networks, coaxial cable networks, etc. IPTV is an example of an IP service. It is a video service offered by a service provider that owns a network infrastructure and controls the content distribution to its customers. Typically, IPTV services run over a multi-service IP network/infrastructure which can provide data, voice and video on the same network/infrastructure. Usually, the information included in the services is protected against unauthorized access/usage. As an example, broadcast/multicast protection systems normally operate with a number of distinguished steps. A service registration step is usually required in which a user enters an agreement with a service provider in a communication network i.e. the user becomes a subscriber or customer. In this step, the user is e.g. provided with a personal, unique and secret subscription key which may be provided as a hard or soft token, e.g. in the form of a smart-card, or software certificate. In a key-distribution step, one or several information protection key(s) is/are distributed (e.g. protected by the subscription key) to registered users for decryption of the protected information. The service provider in the network encrypts the protected information using these information protection keys in a service delivery protection step. In addition, the service provider can perform a re-keying in order to update the protected information key(s), e.g. when a new user is registered or when a user de-registers or when a key is compromised. The service provider may also perform a periodic re-keying to further increase the security of the system. In for example a home environment, a family/household is generally considered to have a common subscription for all users in the home. This is the case if the service(s) is an IPTV channel or a TV channel is general. But even if a certain service is included in a family's subscription, this does not mean that any device/user should be able to access to the service. For instance, it is desirable to protect children from certain types of content. Some other (high-value) content may be allowed to be played on certain trusted (e.g. high security level) devices, or only on a limited number of devices, even for other services. Since only a limited number of devices (or group of devices) may be allowed to have access to certain services e.g. in a home environment, all the services provided to the group in the home environment should not be encrypted with the same key. Otherwise, all devices of the group owning the key will be able to have access to all services in the domain.

There are well known DRM (Digital Rights Management) techniques which can be used to implement access control in such groups by encrypting content and controlling which users/devices have access to the decryption key. When a user/device either leaves or joins a service group it is necessary to change the key; a process associated with overhead. For example, if a single user/device leaves the service group, all remaining users/devices must typically be re-keyed, and each such re-key operation requires signalling, cryptographic operations etc.

In for example a typical IPTV scenario, a common event is that a user stops watching one channel and switches to another channel, i.e. the user moves between an old and a new service group. A drawback with having to update the key(s) every time a status of a user changes i.e. every time a user/device leaves or joins a group, hereinafter denoted a service group, where services are available for the user, is that both the key(s) of the old service (or old group of services) and the key(s) of the new service (or new group of services) has/have to be updated. Such re-keying or updating of the keys increases the computational load, affects negatively the quality of service, etc., not only for the device of the user that leaves or joins the group but also for all other devices that have access to the old service and the new service(s) or group of services. In other words, as discussed above, the number of users/devices to be given a new key is proportional to the size of the whole service group, even if only a single user leaves/joins the service group. The user that leaves or joins a service group will force non-leaving or non-joining users to undergo the key management process. The problem is even more pronounced when we have a public environment where a service group can have hundreds or even thousands of users/devices, since forcing all users of the group to undergo the key management will cause large overhead and computation load and will affect the quality of service perceived by the users (e.g. unnecessary lags, interruptions etc.).

There exist key management schemes/approaches proposed that can reduce the computational load such as group key distribution protocols used to improve scalability. The following prior art documents describe key management schemes:

LKH (Logical Key Hierarchy) defined in a RFC 2627 report entitled: "*Key Management for Multicast and Architectures*" issued by the standardization organisation Internet Engineering Task Force (IETF) issued June 1999.

SD (Subset Difference) described in a document by Naor, and Lotspiech and entitled "*Revocation and Tracing scheme for stateless receivers*", manuscript 2001.

LSD (Layered Subset Differences). described in "*The LSD Broadcast Encryption Scheme*" by Dani Halevy, Adi Shamir, Proceedings of CRYPTO 2002: pp 47-60

However, the number of key management operations known from the prior art, still depends on the group size. For example, typically in a group of e.g. N users (N can take any value), the number of key management operations will grow like log (N). While this is a great improvement compared to a linear dependency of N, it will still depend on the group size. Also, these described schemes require their own administration overhead which may not pay off at all unless N is very large. In particular, if a user sequentially moves between different service groups, the overhead will even be dependent on the total number of users accumulated over all m groups (m can take any value larger than 1). Furthermore, for the e.g. log(N) affected devices, the disturbances will still occur every time a device joins or leaves their group. In other words, the above-mentioned schemes succeed in reducing the number of affected devices, not in reducing the gravity of the disturbance.

Another known approach to reduce the computation load is to pre-distribute keys to users/devices. However, this would mean that devices/users are in possession of keys that are perhaps unnecessary, leading to unwanted increased risk of key exposure thus affecting the secrecy of the individual services/groups of services. Moreover, the number of required keys is considered in general to be exponential to the number of users to enable all possible configurations of users into groups making memory/storage space in user devices an issue. A known key management method is described in European patent application number EP 1549010A1. In this prior art document a inter-area rekeying of encryption keys in secure mobile multicast communications is disclosed, in which a domain group controller key server distributes traffic encryption keys to local group controller key servers serving respective group key management areas. According to this prior art, no local rekeying is triggered whenever a mobile current group member moves between two areas of the group. This is performed to avoid rekeying when a group member moves within the group. But whenever a new member (as opposed to a current group member entering the area by intra-group mobility) joins the group, rekeying operation is performed.

SUMMARY

It is thus an object of the exemplary embodiments of the present invention to address the above mentioned drawbacks by providing an apparatus for key management and a key management method that is easier and more efficient than prior art schemes, while keeping a high level of secrecy for the individual services or groups of services and also avoiding a reduction in the quality of service perceived by users of the groups.

According to a first aspect of embodiments of the present invention, the above stated problems are solved by means of a method of key management in a communication network that comprises a plurality of service groups where each group includes one or several members (e.g. devices/users etc.) that is/are authorized to have access to key-protected services provided to the group. The group may represent a home environment; an enterprise environment, a public environment, a network cell, a network sub-cell or any other suitable environment. According to exemplary embodiments of the present invention the key management method comprises the steps of: determining when a member of a group starts switching from a key-protected service of the group to another key-protected service of another group, i.e. determining when a status of a member changes; determining a time dependent quantity starting from the time said member started the switching; determining that the member is a member of a service switching group when (or as long as) the time dependent quantity is less than a predetermined threshold value and when the time dependent quantity is greater that the threshold, determining that the member has decided to join a new service group; and changing the access key of the key-protected services of the key-protected services of the new service group which the member has joined. The time dependent quantity may e.g. represent a number of bits/bytes received by the member from the time the member starts the switching or may represent a time duration counted from the switching time or may represent a geographical movement of the member counted from the switching time. The method further comprises resetting of the time dependent quantity each time the member performs a new consecutive or subsequent switching.

According to an embodiment of the present invention, the method further comprises changing the access key of the key-protected services of the service switching group.

According to another embodiment of the present invention, the new access key(s) of the key-protected services of the service switching group is/are distributed to members of this switching group. Furthermore and in accordance with an embodiment of the present invention, the new access key(s) of the key-protected services of the services of the new service group is distributed to members of this new service group. Yet according to an embodiment of the present invention, the key(s) of the key-protected service(s) of the group that the member initially switched from, is/are changed to a new key(s) in order to guarantee forward security, and this/these new key(s) is/are further distributed to members of the group the member initially switched from, in order to allow the members to maintain having access to the key protected service(s).

According to a second aspect of embodiments of the present invention, the above stated problems are solved by means of an apparatus for key management in a communication network that comprises a plurality of service groups where each group includes one or several members (e.g. devices/users etc.) that is/are authorized to have access to key-protected services provided to the group. The apparatus is configured to provide said services to group members. The apparatus is further configured: to determine when a member of a group starts a switching from a key-protected service to another key-protected service of another group; the apparatus is further arranged to determine a time dependent quantity starting from the time the switching is performed by the member; to determine that the member is a member of a service switching group when the time dependent quantity is less than a predetermined threshold value; to determine that the member has decided to join a new service group when the time dependent quantity becomes greater than the threshold value; to change the access key of the key-protected services of the new service group which the member has been determined to join.

As mentioned above, members of the service switching group are given/distributed the new key of the key-protected services of this service switching group and members of the new service group are given/distributed the new key of the key-protected service of the new service group. The distribution is performed by means of said apparatus. Furthermore, the apparatus is further configured to change the access key of the key-protected services of the service group that said member initially switched from, and to further distribute the key to other member(s) of the initial service group. Furthermore, the apparatus is further arranged to change the access key of the key-protected services of the service switching group.

An advantage with the present invention is to facilitate the key management in the network since the updating of key or keys is/are performed when the member starts switching, but is then not repeated until after the time dependent quantity following a switching performed by a member, is determined greater than a predetermined threshold value, i.e. after that the member has decided to join a new group.

Another advantage with the present invention is that by introducing a service switching group, the quality of service related issues is minimized when a member/device is switching. In other words, as long as a member is switching and is at the same time a member of the service switching group no re-keying is performed and thus the quality of service is not reduced for the other members; the number of interruptions are reduced/minimized and the computation load on user devices is kept to a minimum. In particular, the users who are not switching are not disturbed by switching users as they are not affected by any key management overhead and the users who are switching will not experience any extra delay when switching.

Another advantage is that the signalling overhead is reduced and the computational load on the key management entity/apparatus is also reduced.

Still other objects and features and advantages of the present invention will become apparent from the following detailed description in conjunction with the accompanying drawings; attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

DETAILED DESCRIPTION

In the following description, for purposes of explanation and not limitation, specific details are set forth such as particular architectures, scenarios, techniques, etc. in order to provide thorough understanding of the exemplary embodiments of the present invention. However, it will be apparent from the person skilled in the art that the present invention and its embodiments may be practiced in other embodiments that depart from these specific details.

The different exemplary embodiments of the present invention are described herein by way of reference to particular scenarios. In particular, the exemplary embodiments of the present invention are described in a non-limiting context in relation to a communication network wherein IP services are provided. Such IP services may include an IPTV service, also referred here as an IPTV channel, which is provided by a service provider that is part of the network infrastructure or that owns the network infrastructure and that controls content distribution to its customers. The services or channels are generally protected by a key (e.g. an encryption key) in order to prohibit unauthorized use/access and also to protect the content owner's interest so that they can be guaranteed a reasonable compensation for letting the service provider's customers take part of the content and not end up handing out content for free due to unauthorized re-distribution, etc.

It should be noted that the exemplary embodiments of the present invention are not restricted to IPTV channels/services i.e. any other key-protected services can be used e.g. music, electronic book, movies, online games, media streams, software/computer programs, data, etc.

Furthermore, the present invention is not restricted to a fixed IP network infrastructure i.e. the present invention is also applicable in e.g. a wireless network, such as a third generation (3G) network; a LTE network (Long Term Evolution) and/or a network based on DVB (Digital Video Broadcasting) technology capable in handling digital audio, video and other data, such as DVB-T (Terrestrial) for the broadcast transmission digital terrestrial television; DVB-S for satellite television, DVB-H for bringing broadcast services to mobile handsets, DVB-C for broadcast transmission over cable, MBMS (Multimedia Broadcast Multicast Service) for 3GPP mobile networks, etc. It should be noted that the DVB technology is used mainly in Europe. The present invention is also applicable in e.g. the corresponding technologies or family of technologies in e.g. North America i.e. the ATSC standard (Advance Television System Committee); in Japan/Brazil the ISDB standard (Integrated Services Digital Broadcasting); in Korea, the DMB standard (Digital Multimedia Broadcasting), etc.

Figure 1A:
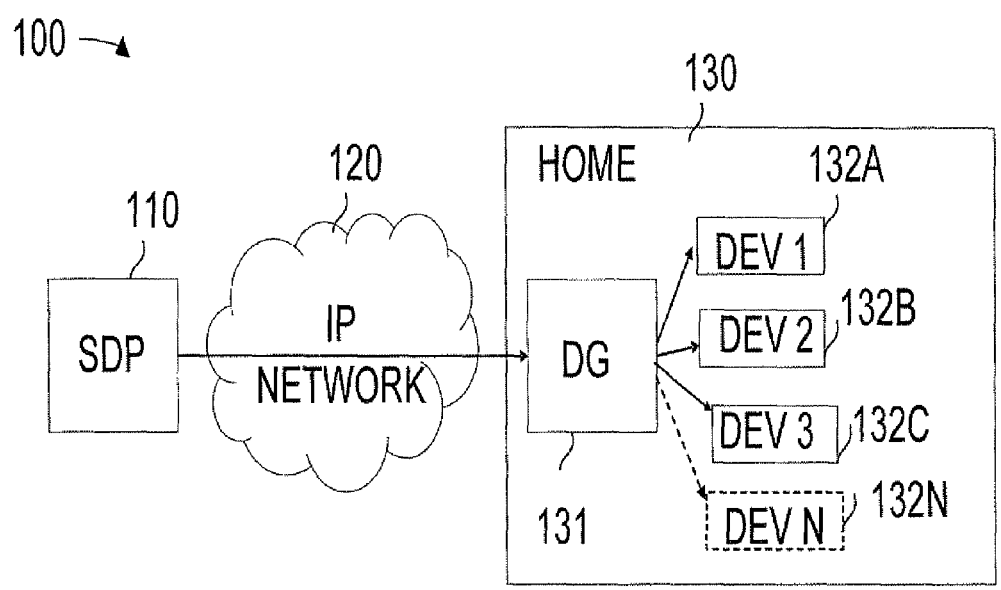
FIG. 1A is a block diagram illustrating an exemplary network infrastructure wherein exemplary embodiments of the present invention can be applied.

Referring now to FIG. 1A, there is illustrated a block diagram of an exemplary communication network infrastructure 100, in which the different exemplary embodiments of the present invention may be applied. Note that the network depicted only shows entities/apparatus/nodes/devices that are necessary for understanding the different exemplary embodiments of the present invention. As shown, network 100 comprises a node 110 exemplifying a Service Distribution Provider (SDP) that is connected via an IP network 120 to a local environment (or domain) 130, which in this exemplary scenario represents a home environment. In the home environment 130 an apparatus 131 is provided e.g. a gateway (e.g. the DG) or a digital set-top box receiver etc. which is configured to receive services from the SDP 110 via network 120 and further configured to provide those services to one or several devices 132 (DEVi, i=1, 2, 3 . . . ) denoted here 132A, 132B, 132C, 132N, in the home domain 130. Note that the home domain 130 is not restricted to any particular number of devices 132 or number of apparatuses 131, nor to any specific type of devices 132, e.g. one of the device 132 may be an LCD (Liquid Crystal Display) flat screen TV, another device 132 may be a laptop computer or a desktop computer, while yet another device 132 may be a handheld device such as a mobile phone. As an example, if the local environment is a public environment, the number of devices 132 and the number of apparatus 131 is generally larger than in a home environment. Note that the use of an apparatus 131 (e.g. a DG (domain gateway)) in the home 130 has advantages e.g. it off-loads the SDP 110; it improves scalability; it improves end-user privacy etc. However, an end-to-end architecture (e.g. between a DG located at the SDP's domain to the different devices 132) may also be used. In the home domain 130 depicted in FIG. 1A, it is assumed that a plurality of key-protected services (e.g. IPTV channels or sets of channels) is available.

Figure 1B:
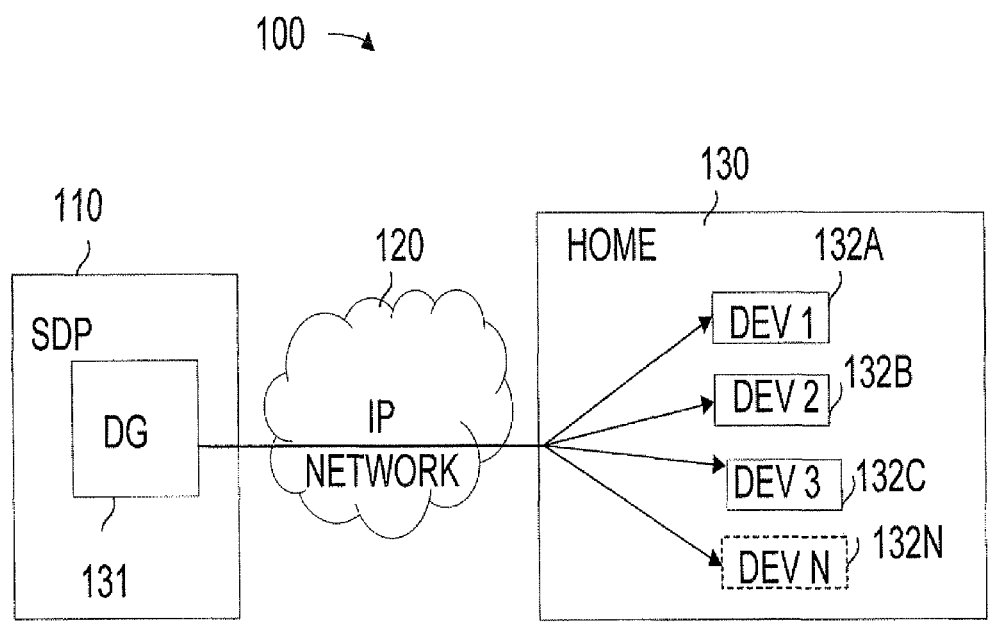
FIG. 1B is another block diagram illustrating another exemplary network infrastructure wherein exemplary embodiments of the present invention can be applied.

FIG. 1B shows another exemplary network 100 wherein the embodiments of the present invention can be applied. The network of FIG. 1B is almost similar to the one of FIG. 1A but here the DG 131 is instead located at the SDP's domain 110 instead of the home domain 130.

Figure 2:
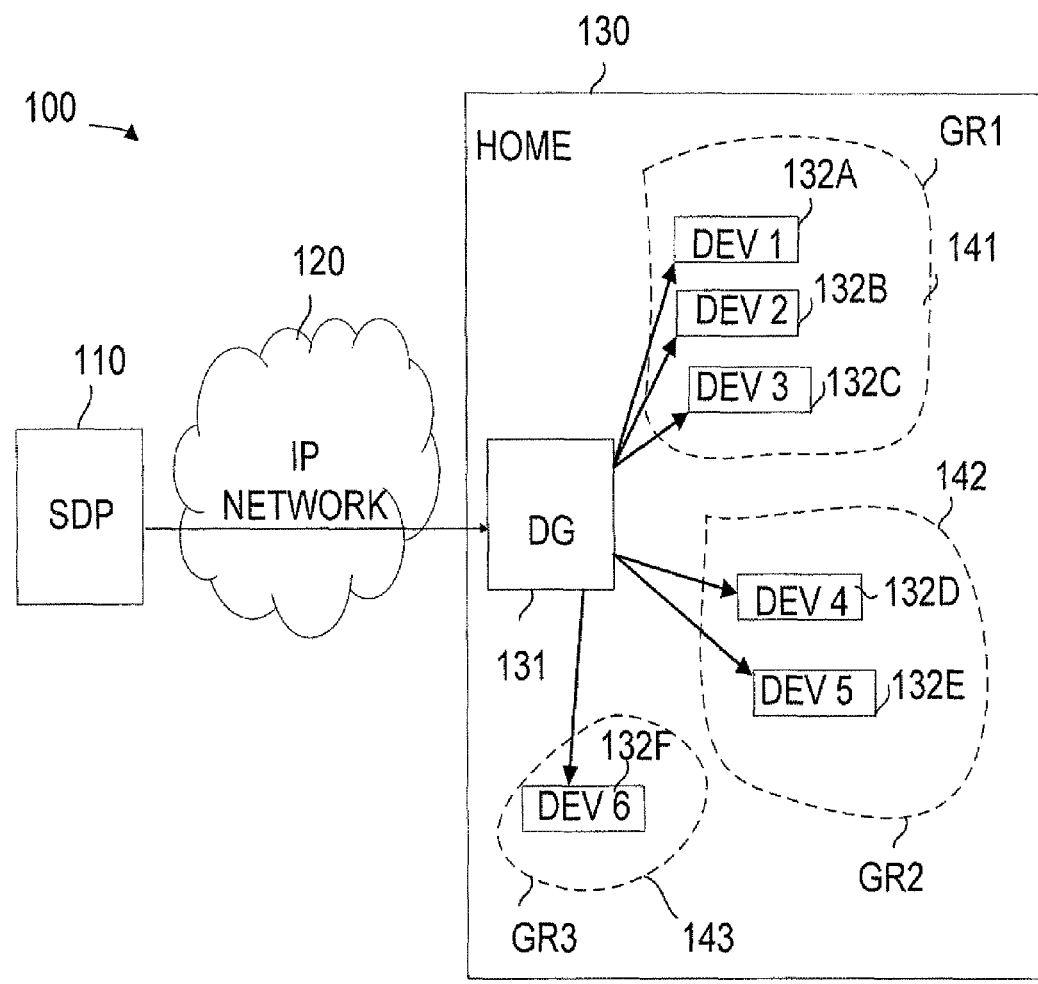
FIG. 2 is a block diagram illustrating the exemplary network infrastructure of FIG. 1A with the addition of service groups and group members.

Referring to FIG. 2, there is illustrated an exemplary network scenario in accordance with an exemplary embodiment of the present invention. As shown, network 100 comprises, in addition to the SDP 110, the IP network 120, the home domain 130 and the DG 131, a number of devices 131A, 132B, 132C, 132D, 132E, 132F. Devices 132A, 132B and 132C are here considered members of a first service group; denoted GR1 141; devices 132D and 132E members of second group GR2 142 and device 132F a member of a third group GR3 143. Now, suppose that members of GR1 (i.e. 132A, 132B and 132C) have access to one or several encrypted items of content (e.g. content of IPTV channels/services) of the group GR1 141.

For better understanding the principle of the presently described embodiment, it is assumed here that the members of the second group GR2 are authorized to have access to other IPTV channel(s) which are considered to be different than the IPTV channels provided to the first group GR1, although this is not necessary. Consider now the scenario when a user (not shown) in the first group GR1 141 is watching/listening/downloading/receiving by means of group member 132A a key-protected service denoted S1 (e.g. a TV channel or IPTV channel or media content or data or media stream etc.) of the service group GR1. We denote by Kc the key currently used to protect S1. The key-protected service S1 is provided by the SDP 110 to device 132A via DG 131. The DG 131 thus figures as the entry to the home domain 130 since it is here assumed that all content from the SDP 110 must pass through or via this DG 131 whose main function is to provide network services to members of the groups in the home domain.

As the user of GR1 141 decides to change/switch/"zap" to another service by, for example pressing a key button or a key (channel up/down) on a remote control or on a button/key provided at the group member 132A, he/she then can decide to continue switching/zapping or can stop the switching. The group member 132A is, in this context, considered to be a switcher or a zapper after the user has pressed a channel (or up/down) key, and then as long as it repeats a key press within a predetermined time limit. Otherwise, the group member 132 is considered a viewer of the channel/group on which the group member "camps".

According to an exemplary embodiment, when the group member 132A (or the user by means of the group member 132) performs/starts the first switching/zapping from a key-protected service S1 of GR1 to e.g. a key-protected service S2 of the second service group GR2 142, a time dependent quantity is determined starting from the switching time. The time dependent quantity is e.g. the time duration counted from the switching time, or the number of bits/bytes received by the group member 132A. If the time dependent quantity is less than a predetermined threshold value (e.g. a maximum value of 10 seconds or maximum value of 100 Kbytes), the group member 132A is determined to be a member of a service switching group (not shown). According to an embodiment of the present invention, the service switching group can be viewed as a service zapper group which includes switching devices or zapper devices. All services or channels being "visited" by at least one switcher or zapper, are considered encrypted by a key denoted by e.g. Kzap. The set of currently switching/zapping devices has access to this key Kzap and thus forms the service switching group. When the time dependent quantity is larger that the predetermined threshold value i.e. when it is determined that the group member 132A has decided to join GR2 and becomes a viewer of key-protected service S2, the key management to be performed is according to an embodiment of the present invention the following:

the access key of the key-protected services of group GR2 is changed to a new key. This is done to assure backward security. Furthermore and in accordance with an embodiment of the present invention, the access key of the key-protected services of the service switching group is also changed to a new key. Furthermore, and in accordance with embodiments of the present invention, the members of GR2 and the members of the service switching group need the corresponding new key(s) in order to maintain having access to key-protected service(s) of GR2/the service switching group. To achieve this, the new key(s) of the key-protected services of the service switching group is/are distributed to members of this switching group and the new key(s) of the key-protected services of the new service group (i.e. GR2) is/are distributed to members of this new service group. Note that the access key of each key protected service of the service switching group can be viewed as a temporary key, used while group member 132A belongs to the switching group.

According to yet another embodiment of the present invention and in order to achieve even higher degree of access control, the key of the service switching group, Kzap, is changed/updated also at the point in time when group member 132A initially starts the switching, i.e. when 132A was initially determined to become a member of the service switching group. The new key Kzap is then preferably distributed to the users of the service switching group (including member 132A).

According to another embodiment of the present invention, the access key of the key-protected services of GR1 to which the group member 132A initially belonged is also changed to a new key. This could be done when the switching is determined to start or when it is determined to stop. This is performed in order to ensure forward security for service group GR1. This new key is further, in accordance with an embodiment of the present invention, distributed by DG 131, to all the members of GR1 that still belong to GR1 in order to allow the members of GR1 to maintain having access to the key-protected services of service group GR1.

It should be mentioned that in case the group member 132A did not join GR2 and instead continued to be a member of the service switching group, no keys are changed until the group member 132A decides to join a new group (GR2, GR3, etc.). It is the above mentioned time dependent quantity that is used to determine if a member stops the switching or not. In other words the status (join/leave) of the group member is determined by the time dependent quantity. According to embodiments of the present invention, the time dependent quantity is reset every time a switching is started and then for every consecutive (subsequent) zap. The time dependent quantity is reset to e.g. zero seconds or zero bits/bytes or to any appropriate reset value. As an example, assume that a threshold value for time-out is set to 3 seconds. When the time dependent quantity is larger that the threshold, it is determined that the group member join has decided to join a new service group and the time dependent is reset to e.g. zero. Now suppose we do not reset the time dependent quantity at every consecutive zap/switch. As an example, assume that the group member 132A first switches (at time zero) from a service (e.g. channel 0) to another service (channel 1). After e.g. 1.5 sec. the group member 132A switches to yet another service (channel 3) and after an additional 1.49999 sec. switches to a further service (channel 3). Very shortly after this point (e.g. 0.00001 sec) it is determined that the user/member 132A has decided to join channel 3 (or the service group for channel 3) since the total time from the first switch is now accumulated to be larger that 3 seconds (i.e. the time dependent quantity is larger that the predetermined threshold value). However, neither of channels 1, 2 or 3 have been visited/viewed for more than e.g. 1.5 sec. In fact, this example shows that channel 3 has only been viewed for 0.00001 sec. but yet we assume that the member 132A wants/decided to join the service group where channel 3 is available. Therefore, in accordance with some exemplary embodiments of the present invention, the time dependent quantity is configured to be reset at each (consecutive) switching/zapping that is performed by the user/member. In other words, the time dependent quantity is reset after the first switching/zapping and again after the second consecutive switching/zapping and again after the third consecutive switching/zapping etc. independently on the predetermined threshold value in order to better predict the behaviour of the member 132A and in order to correctly know the status of the member 132A (e.g. if the member is a viewer or a switcher/zapper)

It should be noted that the reset value is a design value and may therefore be configured based on design and/or deployment environments. The predetermined threshold value (threshold) is also a configurable design value.

When it is determined that the group member 132A, has decided to join GR2, it is verified if the member 132A is authorized to have access to the key-protected service of GR2 i.e. S2. If the group member 132A is authorized then the new key used to protect services of GR2 is distributed to group member 132A by means of apparatus 131 (DG 131).

Figure 3:
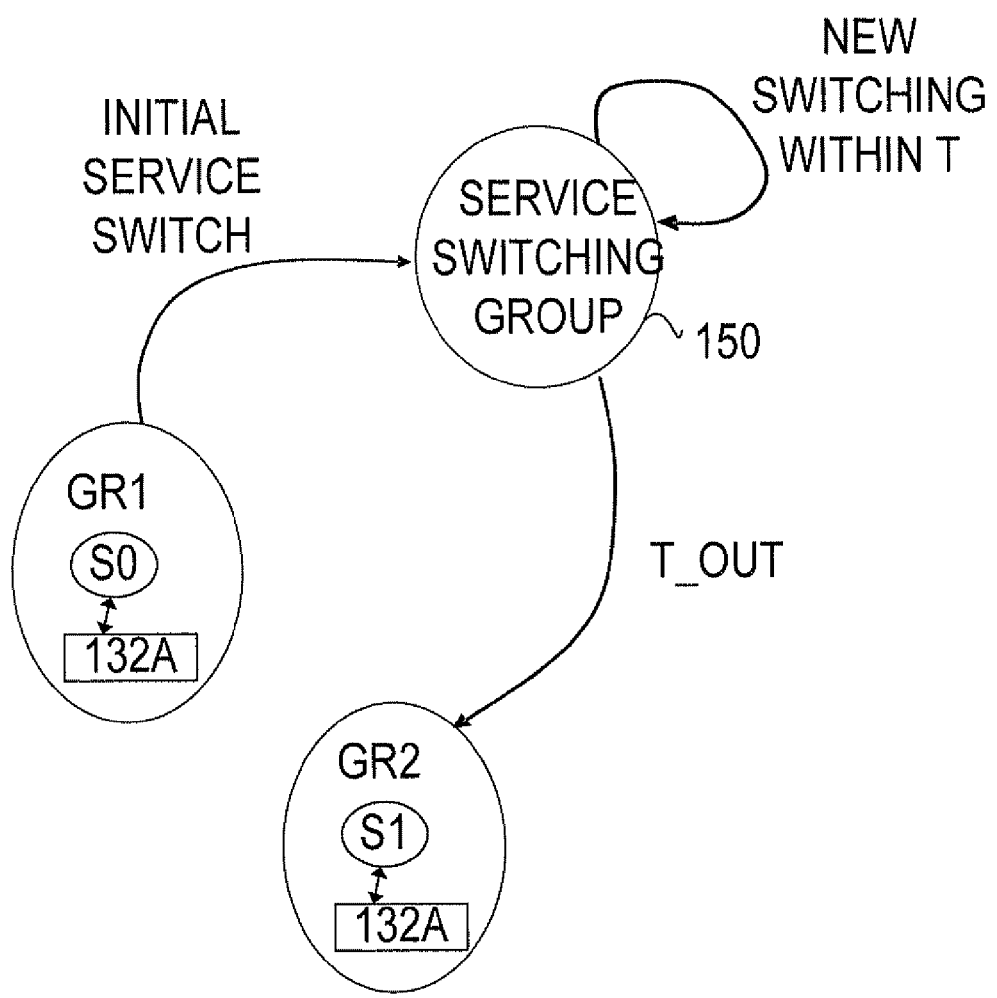
FIG. 3 is a block diagram showing an exemplary state transition/group membership change of a member/device, in accordance with some exemplary embodiments of the present invention.

Referring to FIG. 3, there is illustrated an exemplary state transition/group membership change of a member/device, in accordance with the above described exemplary embodiments of the present invention. It is assumed here that only two service groups GR1 and GR2 are present, although any number of service groups and any number of switching groups can be used.

As shown in FIG. 3, service group GR1 wherein a service S0 is assumed currently available to a group member e.g. group member 132A is authorized access to said service S0. This is schematically indicated using a double arrow between S0 provided (by the DG) and group member 132A. When the group member 132A starts a switching i.e. a user presses e.g. a key button for a new service S1 belonging to another service group GR2, it is determined that the member 132A is a member of the service switching group 150, i.e. the system (typically the DG (not shown) sets status of the member 132A to a switcher (or zapper) and adds the group member 132A to the switching group by distributing it a key Kzap. The status of the member 132A is thus now status (member 132A)=(S0, switcher, S1). The member 132A can now have temporary access to S1. As long as the member 132A switches/zaps again (to a new service e.g. Si) within a predetermined time T representing an example of the predetermined threshold value discussed earlier, the status of the group member 132A is just updated i.e. (status (member 132A)=(S0, switch, Si) where i=2, 3, . . . n). In case, a time-out (T_OUT) occurs i.e. the time dependent quantity is larger that T, the system (DG) is configured to verify authorization of member 132A for the service he is viewing at the moment (e.g. S1) and if the member 132A is authorized, the DG changes the status of the member 132A to a "viewer" of channel S1 and initiates the process of joining member 132A to e.g. another service group GR2 as shown in FIG. 3, by distributing to it a new key to the member 132A and also to other members (not shown) of GR2.

In order to further explain the different exemplary embodiments of the present invention in conjunction with the state transition diagram of FIG. 3, the different steps that are used are described below.

It is supposed that the group member 132A, denoted below D, is currently having access i.e. viewing service S0. Furthermore, we denote by Kci the key currently used to protect service Si, where I=1, 2, 3, . . . For a device member D, we use status (D)=(x, y, z) where x, z are services and y="viewer" or "switcher/zapper" to record whether y is a (stable) viewer or zapper of service z. In the case that D is a y="zapper", x records the last service which D was viewing before staring to switch/zap.

Step 1. D starts a switching/zapping to a new service S1.

Step 2. If D had status (*,viewer,*), or, if no device previously had status (*,*,S1) the system (typically the DG) authorizes D for S1.

Step 3. If, OK (i.e. authorization is verified and accepted by the DG) the DG sends Kzap to D and if S1 was not already being sent to any switcher, the DG starts to send S1 encrypted using Kzap.

Step 4. The DG sets status (D)=(S0, switcher/zapper, S1) since D has the key Kzap and is therefore a member of the service switching/zapping group. D can view the service S1. The key Kzap may be the key already distributed to the service switching group, or, Kzap may be updated in conjunction with D starting to zap/switch (in which case Kzap also is distributed to the other members of the service switching group).

Step 5. As long as the time dependent quantity is less that T, i.e. as long as the device member D switches/zaps again (to e.g. a new service S2) within a predetermined time T, the status is just updated: status (D)=(S0, switcher/zapper, S2) and we go back to Step 2 (replacing S1 by S2). Note again, for each zap/switch, the time dependent quantity T is reset to a predetermined value (e.g. zero).

Step 6. Else, if a time-out occurs (i.e. the time dependent quantity is larger that T), the DG authorizes D for the service S2.

Step 7. If OK, the system (i.e. the DG) changes status (D)=(*, viewer, S2) and initiates a process of joining D to channel group of S2 by giving/distributing it Kc2, where Kc2 is the service key of the service S2.

According to an exemplary embodiment of the present invention the apparatus (e.g. the DG) can maintain a list of the set of switchers/zappers and a list of all the services currently being "visited" by a switcher/zapper. Such lists can be explicitly maintained or implicitly maintained via the states of the device (or group) members. Every T seconds or every T bytes (depending on whether the time dependent quality is a time duration or a number of bytes/bits received) we update these lists as e.g. a background process to rake or garbage-collect the service switching group at certain intervals. For all devices D in a current switching group, having status (*, switch/zap, S) such that D is authorized for services S, we include D into the service switching group and we include S into the list of the services currently being "visited". We then change the access key of the key-protected services of the service switching group, from Kzap to e.g. Kzap' (or to any other new random key), and we distribute Kzap' to all members of the service switching group. For all services S belonging to the list of services being currently "visited" but not in next list of services we stop encrypting/broadcasting S; and for all services S in next list of services but not in the list of services being currently "visited", we start encrypting S using Kzap'. Furthermore, we switch encryption key for S to Kzap' for all services S in list of services currently being visited and in next list of services. The lists (switching list and service list) are subsequently updated.

As mentioned earlier, forward security, in accordance with an embodiment of the present invention, is also applied. This is because, a member D that e.g. has been viewing (or having access to) a service S1 and that switches to S2 will otherwise gain access to both S1 and S2. Forward security is achieved by adding an addition step (Step 8 below) to the above described list of steps, according to:

Step 8. run the process of removing D from service group S0 by updating and re-distributing a new service key Kc0 for all members still having status (S0, viewer, S0).

It should be noted that in the case a member D switches/zaps for the first time to another service, authorization is performed. But in subsequent switches, authorization is performed based on the predetermined threshold value T (i.e. the time-out mechanism described earlier). Thus, if D switches/zaps to an authorized service S1 and then immediately to a service S2, and at least one other device or member was already a switching member on S2, then D will be able to have access (or view) S2 for T seconds (or T bytes/bits) even if it was not authorized for this service. A member of the service switching group is therefore, authorized to view (or have access) to services of the switching group but only for T seconds (or T bytes). In other words, no changing of keys is required in this case.

However, the present invention is not restricted to the case described above, because it is also possible to differentiate access within the switching group. To differentiate access so that a switching member does not automatically gain access to all services belonging to the switching group, the apparatus (or the DG) can also be configured to use per-switch/zap-service unique keys which are updated (after authorization) as a user or a member switches between services belonging to the service switching group. It should be noted that this might increase the key management complexity. However, at any given time the number of users/members per switcher/zapper service is likely not so large and therefore manageable. And we still have the benefit that a member only "visiting" a service for a short time during switching/zapping, does not affect the service experience for those users/members who are stable viewers of the service as the key management for viewers is not necessarily dependent of that of switchers/zappers.

Furthermore, it is also possible using the present invention to provide a per-switching-channel key. As an example, if device D1 and device D2 are switchers (i.e. zappers) on service S3, while device D3 is a switcher on service S7, then the DG is configured to provide service S3 encrypted with one key (known to D1 and D2), service S7 encrypted with another key (known to D3). This exemplary embodiment has probably less computational complexity than per-switch keys, yet every switcher has only access to the current service he "switches" to, and the previous already zapped/switched (since he already has the keys), but not to all services.

The previously described algorithm (Steps 1-7) according to exemplary embodiments of the present invention, allows a user/member to come back and "re-visit" a service after several switches/zaps. For example, let us consider the case where a member executes an exemplary chain of switch or zap actions: S0→S1, S1→S2; S2→S0. The algorithm does not forbid the member from watching S0 again after X seconds (or X bytes) e.g. if X is less than 3T. If the transition between services is fast enough (e.g. lower that the predetermined threshold value T), the member can view (or have access to) S0 with small "gaps" of lost viewing/access time (corresponding to the time for the 3 switches/zaps S0→S1, S1→S2; S2→S0). However, this is perhaps not a critical issue as the viewing/access experience is quite bad. However to completely avoid this issue, the algorithm can be further improved by keeping track of last Y (e.g. ten) services "visited" by the member and if the member has visited a service (e.g. S0) more than K times among last Y switches/zaps, the algorithm can be configured to verify the member for authorization on that service (S0) every time the member comes back to that service. It should be noted that K is a design parameter that can be predetermined, and Y is also configurable.

Note that if the member refuses to authorize (e.g. to pay) for S0, then during next Y*T times, the apparatus (e.g. the DG) is configured to disallow the member to switch to S0 (e.g. by "quarantining" the member in a new, separate service switching group using a new key).

It was previously described that a temporary key can be used to encrypt a service S. According to an embodiment of the present invention, the apparatus or the DG is also configured to share a secret key with each member. For any member/device Dn, we denote this shared secret key K(DG-n). This key can be used to temporarily encrypt e.g. a new service S1 while the member Dn is a switching member (or a zapper). The services provided for the service switching group are thus not encrypted with the same key, but with secret keys of the switching members. The previously described algorithm (Steps 1-7) may be amended by replacing the previous steps Step 3, Step 4 and Step 5, by the following steps:

New Step 3. If, OK (i.e. authorization is verified and accepted by the DG) the DG starts sending S1 encrypted with K(DG-n).

New Step 4. The DG sets status (Dn)=(S0, switcher/zapper, S1). The device Dn can now view (or have access to) the service S1.

New Step 5. As long as the time dependent quantity is less than T, i.e. as long as the member switches/zaps again (to a new service S2) within the predetermined threshold value T, the status is just updated: status (Dn)=(S0, switch/zap, S2) and we go back to previously described step 2 (replacing S1 by S2).

Note again that the introduction of the new steps 3-4 may results in more encryption and transmission efforts from the DG, the difference being larger as more switching members view (or have access to) similar services. However, it simplifies the key management for the service switching group.

It should be mentioned that the key management according to previously described different exemplary embodiments of the present invention can be combined with prior art schemes. As an example, instead of the simple scheme of directly distributing the service keys (Kc, Kc1, Kzap, etc) to all members of the service group, it is possible to use a hierarchy of keys according to prior art schemes e.g. LKH scheme discussed earlier. The services can be clustered into different groups and each group can be assigned a different key. As an example, once a new member joins the group, there is no need to change the key for all the services but only for the services member of the group. A tree hierarchy can be used to derive keys on different services from e.g. parent keys in order to further simplify the key-regeneration and distribution. Therefore, the present invention is not restricted to any specific group key management scheme. In other words, prior art schemes such as LKH and SD can be used in conjunction.

Figure 4:
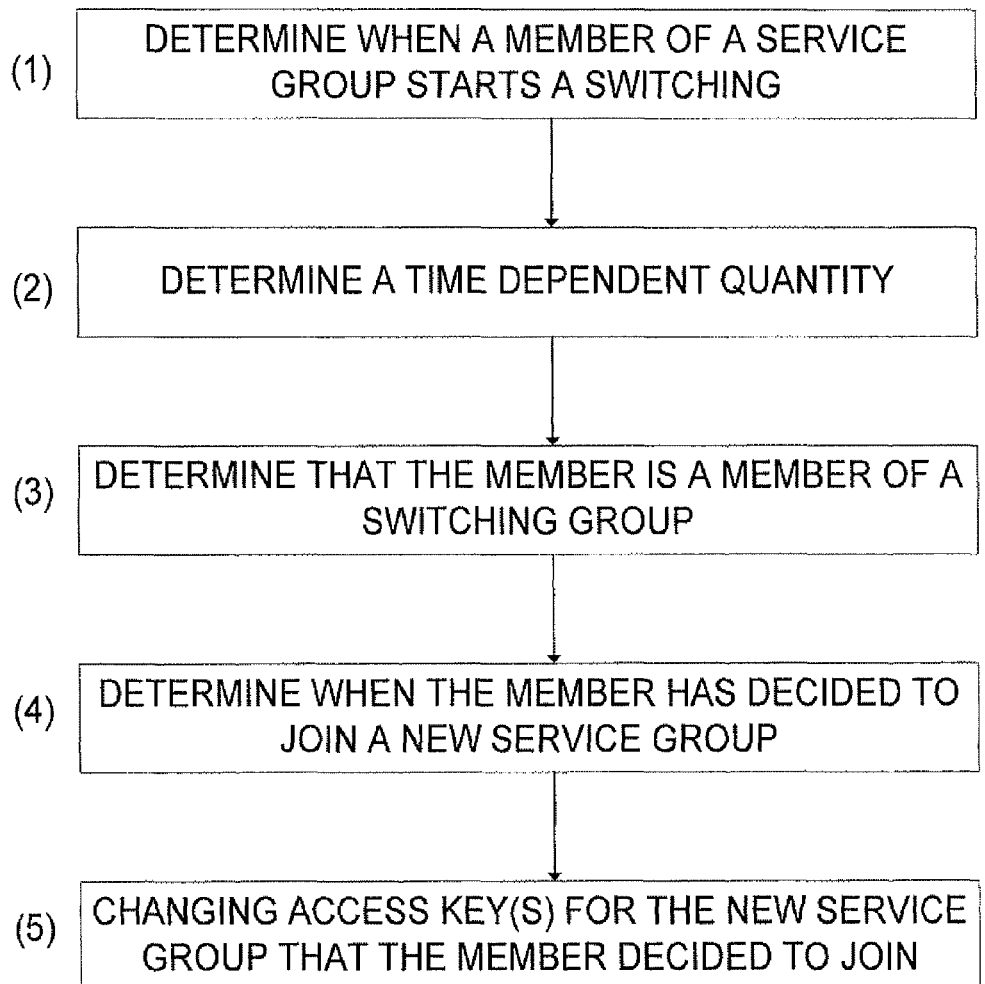
FIG. 4 is a diagram illustrating a flowchart of a method according to exemplary embodiments of the present invention.

Referring now to FIG. 4, there is illustrated a flowchart of a method in accordance with the previously described embodiments of the present invention. Note that in FIG. 4 only the main steps are depicted. The method steps of key management are aimed to be performed by an apparatus (e.g. a DG) in a communication network comprising a plurality of service groups, each group including member(s) authorized to view (or have access) to services (e.g. IPTV channels) available for the group i.e. provided by the DG to the group members. Note that the network may also comprise one or several service groups having non-authorized member/user i.e. a dummy group. As shown in FIG. 4, the main steps comprise:

(1) determining when a member of a service group starts to switch/zap from one service/channel that is key-protected to at least one other key-protected service/channel provided to another group;
(2) determining a time dependent quantity starting from the time the member initiated/started the switching/zapping;
(3) determining that the member is a member of a service switching group when the time dependent quantity is less than a predetermined threshold value (previously discussed);
(4) determining that the member has decided to join a new service group when the time dependent quantity is larger that the predetermined threshold value; and
(5) changing the access key of the key-protected services of the new service group which the member has been determined to join.

As mentioned before, the time dependent quantity is reset every time a new switching/zapping is performed. In addition, the access key of the key-protected services/channels of the service switching group is also changed to a new key. Furthermore, it is verified whether the member is authorized to have access to the key-protected service of the new group. According to an embodiment of the present invention, in order to provide forward security, the access key(s) of the key-protected services of the group that the member decided to leave i.e. the group where the member initially belonged and switched from, is also changed to a new key. This new key is distributed by means of the apparatus (e.g. the DG) to the remaining members of the initial group, in order to allow these members to maintain having access to the key-protected services of the initial group. Note that backward security is also achieved since the key(s) of the key-protected service of the new group that the member has been determined to join, is also changed. The new key for this new service group is further distributed to members of this new service group. In addition, the new key for the service switching group is distributed to members of the switching group.

Additional exemplary embodiments of the present invention have already been presented and are therefore not repeated here.

Figure 5:
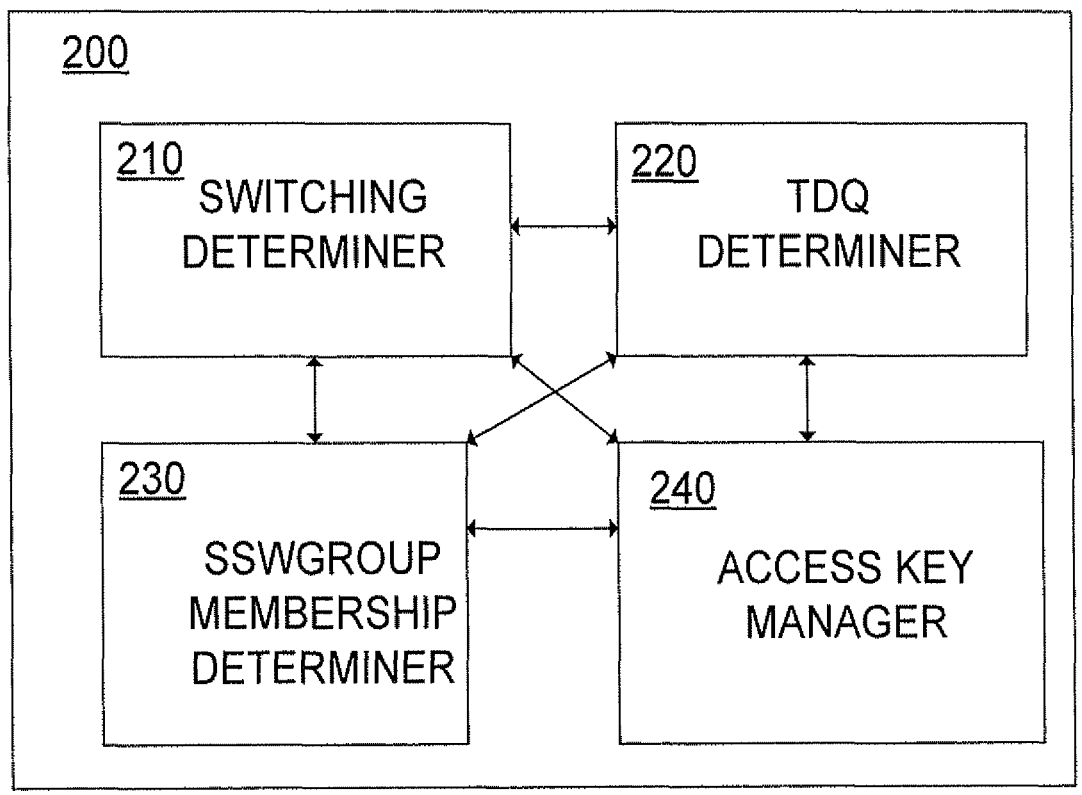
FIG. 5 illustrates a block diagram of an exemplary apparatus according to embodiments of the present invention.

Referring to FIG. 5, there is illustrated a block diagram of an exemplary apparatus 200 in accordance with exemplary embodiments of the present invention. As mentioned earlier, the apparatus can represent a gateway (e.g. a domain gateway) (DG) or any appropriate device that is capable in performing the method of key management discussed above. Furthermore, the apparatus 200 can be placed in any suitable environment such as home domain, a network operator's domain, a service provider's domain or any other suitable environment/domain. The apparatus 200 is configured to perform at least the main steps presented above. As shown in FIG. 5, the apparatus 200 comprises means 210 (denoted Switching determiner) for determining when a member of the group to which the apparatus 200 is dedicated, starts a switching from a key-protected service of the group to a key-protected service of another group. Again, services are provided by (via, through) the apparatus 200 to members of the groups. The apparatus 200 can serve one or several groups depending on the environment wherein the apparatus 200 is located. As depicted in FIG. 5, the apparatus further comprises means 220 for determining the time dependent quantity (denoted TDQ determiner in FIG. 5) counted from the time the member starts the switching. The apparatus 200 also comprises means 230 for determining that the member is a member of a service switching group (denoted SSWGR membership determiner in FIG. 230) when the time dependent quantity is less than a predetermined threshold value. As mentioned earlier, when the time dependent quantity is greater than the threshold value, the apparatus 200 determines that the member has decided to join a new service group. The apparatus 200 further comprises means 240 for changing the access key of the services of the new service group which the member has been determined to join and is further arranged to change the access key of the services of the service switching group. Means 240 is denoted (Access key manager in FIG. 5). Means 240 is also configured to distribute and to handle the management of the keys (e.g. the temporary keys etc.) in the network as previously described. Also, apparatus 200 is configured to assure forward security and backward security, and also configured to perform the distribution of the new keys to the appropriate/corresponding group(s) as described earlier. Apparatus 200 also comprises means (not shown) for verifying the authorization of group members. Note that apparatus 200 may comprise other means not discussed or shown in FIG. 5. Furthermore, the different means of apparatus 200 need not be separated.

As exemplified above a time dependent quantity such as time spent on each service or amount of bits/bytes consumed/received etc. for said service may be used as a criterion for deciding when the user should be considered a viewer rather than a switcher/zapper. However, The time dependent quantity in accordance with the embodiments of the present invention, is not restricted to a time spent on a service or an amount of bits/bytes received/consumed. The time dependent quantity may also correspond to other quantities that can be used to determined the status of a member (switcher/non-switcher). For instance the services S1, S2, . . . , may be location based services, i.e. services which are intended to be available while the user/member is in some geographical location. In this case it is possible to use "amount of movement" of the user as a criteria. Assuming the user/member is accessing services from a mobile terminal it is possible to use the dynamically varying position of the user because existing mobile networks (e.g. GSM or UMTS, LTE, WIMAX etc.) can provide very accurate data on a user's current position. It would therefore be possibly to use such location information to determine e.g. the rate at which the user is moving (geographical movement), the distance travelled etc. Therefore, these quantities can be characterized as time dependent quantities. A switching user/member could then correspond to a user/member that moves at or above a certain minimum speed, and/or that has moved a certain minimum distance, etc. In other words, the predetermined threshold value can correspond to a predetermined maximum amount of movement and/or a minimum speed value and/or a certain minimum distance the member/user moved. As an example, assume that the time dependent quantity corresponds to a geographical movement of the member counted from the time the member stars a switching and the predetermined threshold value corresponds to a predetermined maximum amount of movement. As long as a counted geographical movement of the member is less than the predetermined maximum amount of movement, the user/member is determined a member of the service switching group (i.e. the user is a switcher). When a counted geographical movement of the member is instead larger than the predetermined maximum amount of movement, it is determined that the user has decided to join a new service group and the access key of the key-protected services of this new service group is changed (backward security), in accordance with the embodiments of the present invention. Note that the time dependent quantity corresponding to the geographical movement of the user is reset at each switching performed by the user. Furthermore and as previously described, the key of the key-protected services of the service switching group is also changed; authorization of the user/member in the new service group is verified; forward security is provided, distribution of the new keys to the corresponding member is performed etc.

The present invention and its embodiments can be realised in many ways. For example, one embodiment of the present invention includes a computer-readable medium having instructions stored thereon that are executable by a apparatus (e.g. DG) of a communication network. The instructions executable by the apparatus and stored on a computer-readable medium perform the method steps of the present invention as set forth in the claims.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A method of key management in a communication network that comprises a plurality of service groups, where each group includes at least one member authorized to have access to key-protected services of the group, the method comprising:
    determining when a member of a service group starts switching from a key-protected service of the service group to at least one other key-protected service of another service group;
    determining a time dependent quantity starting from the time said member started said switching;
    determining that the member is a member of a service switching group when said time dependent quantity is less than a predetermined threshold value;
    determining that the member has decided to join a new service group when the time dependent quantity is greater than said predetermined threshold value; and
    changing the access key of the key-protected services of the new service group which the member has been determined to join.

2. The method according to claim 1 further comprises resetting the time dependent quantity each time the member performs a new consecutive switching.

3. The method according claim 1 further comprises changing the access key of the key-protected services of the service switching group.

4. The method according to claim 1 further comprises, verifying if the member is authorized to have access to the key-protected service of the new service group that the member has decided to join.

5. The method according to claim 1 further comprises, changing the key of the key-protected service of the service group that the member initially switched from to a new key, when it is determined that the member has decided to join said new service group.

6. The method according to claim 5 further comprises, distributing the new key to other members of the service group the member initially switched from, in order to allow the other members to maintain having access to the key-protected service.

7. The method according to claim 1 further comprises, authorizing said member by granting access, between switches, to key-protected services, when the determined time dependent quantity is less than the predetermined threshold value.

8. The method according to claim 3 further comprises distributing the new access key of the key-protected services of the service switching group to members of the service switching group.

9. The method according to claim 1 further comprises distributing the new access key of the key-protected services of the new service group to members of the new service group.

10. The method according to claim 1 wherein the time dependent quantity corresponds to a number of bits received by said member from the time the member starts a switching and said predetermined threshold value corresponds to a predetermined maximum number of bits.

11. The method according to claim 1 wherein the time dependent quantity corresponds to time duration counted from the time the member starts a switching and the predetermined threshold value corresponds to a predetermined maximum time duration.

12. The method according to claim 1 wherein the time dependent quantity corresponds to a geographical movement of the member counted from the time the member starts a switching and the predetermined threshold value corresponds to a predetermined maximum amount of movement.

13. A computer implemented apparatus for key management in a communication network comprising a plurality of service groups, each service group including at least one member authorized to have access to key-protected services of the service group, said apparatus being configured to provide said services to group members, the apparatus configured to:
    determine when a member of a service group starts switching from a key-protected service of the service group to at least one other key-protected service of another service group;
    determine a time dependent quantity starting from the time said member started the switching;
    determine that the member is a member of a service switching group when said time quantity is less than a predetermined threshold value;
    determine that the member has decided to join a new service group when the time dependent quantity is greater than the predetermined threshold value; and
    change the access key of the key-protected services of the new service group which the member has been determined to join.

14. The apparatus according to claim 13 is further configured to reset the time dependent quantity each time the member performs a new consecutive switching.

15. The apparatus according to claim 13 is further configured to change the access key of the key-protected services of the service switching group.

16. The apparatus according to claim 13 is further configured to verify if the member is authorized to have access to the key-protected service of the new service group that the member has decided to join.

17. The apparatus according to claim 13 is further arranged to change the key of the key-protected service of the group that the member initially switched from to a new key, when it is determined that the member has decided to join the new service group.

18. The apparatus according to claim 17 is further configured to distribute the new key to other members of the service group the member initially switched from, in order to allow the other members to maintain having access to the key-protected service.

19. The apparatus according to claim 13 is further configured to authorize the member by granting access, between switches, to key-protected services, when the time dependent quantity is less than the predetermined threshold value.

20. The apparatus according to claim 15 is further configured to distribute the new access of the key-protected services of the service switching group to members of the service switching group.

21. The apparatus according to claim 13 is further configured to distribute the new access of the key-protected services of the new service group to members of the new service group.

22. The apparatus according to claim 13 wherein the time dependent quantity corresponds to a number of bits received by said member from the time the member starts a switching and said predetermined threshold value corresponds to a maximum allowed number of bits.

23. The apparatus according to claim 13 wherein the time dependent quantity corresponds to time duration counted from the time the member starts a switching and said threshold value corresponds to a predetermined maximum time duration value.

24. The apparatus according to claim 13 wherein the time dependent quantity corresponds to a geographical movement of the member counted from the time the member starts a switching and the predetermined threshold value corresponds to a predetermined maximum amount of movement.

25. The apparatus according claim 13 is configured as a domain gateway of a home environment in the communication network.

26. The apparatus according to claim 13 is configured as a gateway of a service distribution provider, SDP, of the communication network.

27. The apparatus according to claim 13 is configured as a gateway of a network operator of the communication network.

28. The apparatus according to claim 13 wherein a service corresponds to an IPTV channel and/or a TV channel and/or media content.

29. A non-transitory computer readable storage medium storing computer executable instructions for use with a key management apparatus of a communications network that is associated with at least a first service group and a second service group that each include at least one member that is authorized to access a key-protected service associated with the respective service group, the stored computer executable instructions comprising instructions, when executed by the key management apparatus, configured to:
  provide, at least in part, a first key-protected service to the first service group, the first key protected service protected by a first access key;
  determine when a first member of the first service group initiates a switch away from the first key-protected service associated with the first service group to another key-protected service that is associated with another service group;
  track a time dependent quantity that is initially based on when the first member initiated the switch away from the first key-protected service;
  assign the first member to a service switching group in accordance with the tracked time dependent quantity being less than a certain threshold value;
  assign the first member to the second service group in accordance with the tracked time dependent quantity being greater than the certain threshold value, where time quantities that are greater than the certain threshold value indicate that the first member has determined to join the second service group; and
  change a second access key of the second key-protected service that is associated with the second service group in accordance with assignment of the first member to the second service group and determination that the tracked time dependent quantity is greater than the certain threshold value.

* * * * *

UNITED STATES PATENT AND TRADEMARK OFFICE
CERTIFICATE OF CORRECTION

PATENT NO. : 8,515,064 B2  Page 1 of 1
APPLICATION NO. : 13/127079
DATED : August 20, 2013
INVENTOR(S) : Carvalho et al.

It is certified that error appears in the above-identified patent and that said Letters Patent is hereby corrected as shown below:

In the Specification

In Column 2, Line 53, delete "47-60" and insert -- 47-60. --, therefor.

In Column 7, Line 62, delete "larger that" and insert -- larger than --, therefor.

In Column 8, Line 55, delete "larger that" and insert -- larger than --, therefor.

In Column 9, Line 1, delete "larger that" and insert -- larger than --, therefor.

In Column 9, Line 2, delete "larger that" and insert -- larger than --, therefor.

In Column 9, Line 18, delete "switcher/zapper)" and insert -- switcher/zapper). --, therefor.

In Column 9, Line 56, delete "larger that" and insert -- larger than --, therefor.

In Column 10, Line 8, delete "staring" and insert -- starting --, therefor.

In Column 10, Line 34, delete "larger that" and insert -- larger than --, therefor.

In Column 13, Lines 16-17, delete "larger that" and insert -- larger than --, therefor.

Signed and Sealed this
Fourth Day of February, 2014

Michelle K. Lee
*Deputy Director of the United States Patent and Trademark Office*